United States Patent [19]

Christner et al.

[11] Patent Number: 4,716,023
[45] Date of Patent: Dec. 29, 1987

[54] COMPOSITE PARTIAL OXIDIZER AND REFORMER

[75] Inventors: Larry G. Christner, Newtown; Steven A. Koehler, Bethel, both of Conn.

[73] Assignee: Energy Research Corporation, Danbury, Conn.

[21] Appl. No.: 930,299

[22] Filed: Nov. 13, 1986

[51] Int. Cl.$^4$ .............................................. B01J 8/04
[52] U.S. Cl. ...................... 422/149; 422/190; 429/19
[58] Field of Search ............ 429/19, 20, 17, 26; 422/149, 190, 211; 423/650, 651, 652; 48/61

[56] References Cited

U.S. PATENT DOCUMENTS

| | | | |
|---|---|---|---|
| 3,499,797 | 3/1970 | Hooper | 429/20 |
| 3,516,807 | 6/1970 | West et al. | 48/107 |
| 3,531,263 | 9/1970 | Sederquist | 48/61 |
| 3,976,507 | 8/1976 | Bloomfield | 429/17 |
| 4,200,682 | 5/1980 | Sederquist | 429/17 |
| 4,288,409 | 9/1981 | Fedders et al. | 422/190 X |
| 4,293,315 | 10/1981 | Sederquist | 422/190 X |
| 4,365,006 | 12/1982 | Baker | 429/17 |
| 4,495,154 | 1/1985 | Christner et al. | 422/203 |

Primary Examiner—Anthony Skapars
Attorney, Agent, or Firm—John J. Torrente

[57] ABSTRACT

A partial oxidizer and reformer comprising a tubular member having a wick adjacent its inner wall and a catalyzed metallic spiral adjacent the wick and further comprising an annular member connected to and surrounding the tubular member and in which is disposed a catalyst bed.

7 Claims, 1 Drawing Figure

COMPOSITE PARTIAL OXIDIZER AND REFORMER

This invention was made with Government suuport under Contract No. DAAK70-83-C-0035 awarded by the U.S. Army. The Government has certain rights in this invention.

BACKGROUND OF THE INVENTION

This invention relates to apparatus for reforming hydrocarbon containing fuel and, in particular, to apparatus of the aforesaid type further adapted to provide partial oxidation of the fuel prior to reformation.

In U.S. Pat. No. 4,365,006 there is disclosed a system in which a partial oxidizing unit followed by a steam reformer is utilized to convert hydrocarbon containing fuel to hydrogen gas for use as fuel process gas for a fuel cell. In the '006 patent fuel is vaporized in a separate vaporizer and the vaporized fuel is introduced with cathode exhaust gas into the partial oxidizing unit. The fuel is then partially oxidized and the resultant product introduced into the steam reformer to produce hydrogen gas. The '006 patent also mentions that the anode exhaust may be burned with air in a separate burner and the burner product used to heat the vaporizer and partial oxidizing and steam reforming units.

The advantage of the '006 system is that the use of the cathode exhaust gas and the partial oxidation unit enables water to be produced internally in the system in sufficient quantity for steam reforming. This avoids the need to store and mix water with the fuel, thereby greatly simplifying the system.

While the '006 system is thus advantageous, the use of a separate vaporizer for the fuel and a separate burner for heating the vaporizer and partial oxidizer and reforming units adds to the complexity of the system. Also, it would be advantageous if the partial oxidizing and steam reforming unit could be utilized to control pressure and hydrogen gas output of the system.

It is, therefore, a primary object of the present invention to provide a composite apparatus for partial oxidizing and steam reforming which avoids the aforementioned system drawbacks.

It is a further object of the present invention to provide a composite apparatus for partial oxidizing and steam reforming which incorporates fuel vaporizing and which allows for control of pressure and fuel gas output, while eliminating the need for a separate burner.

SUMMARY OF THE INVENTION

In accordance with the principles of the present invention, the above and other objectives are realized in an apparatus comprising a tubular member having disposed therein along its length and adjacent its inner walls a wick and further having a spiral metallic member carrying a catalyst disposed adjacent the wick. The apparatus further includes a steam reformer and shift converter following the tubular member.

With this configuration for the apparatus, the tubular member with its wick and catalyst coated metallic spiral acts as a composite vaporizer, partial oxidizer and heat generator, thus eliminating the need for a separate vaporizer and heat generating burner. Furthermore, the catalyst coated spiral allows for control of the fuel gas output and pressure drop of the overall apparatus.

In the embodiment disclosed hereinafter the reformer/shift converter comprises an annular member which surrounds the tubular member and in which is disposed catalyst for reforming and shift conversion reactions.

BRIEF DESCRIPTION OF THE DRAWINGS

The above and other features and aspects of the present invention will become more apparent upon reading the following detailed description in conjunction with the accompanying drawings, in which the sole FIGURE illustrates apparatus in accordance with the principles of the present invention.

DETAILED DESCRIPTION

Figure 1:
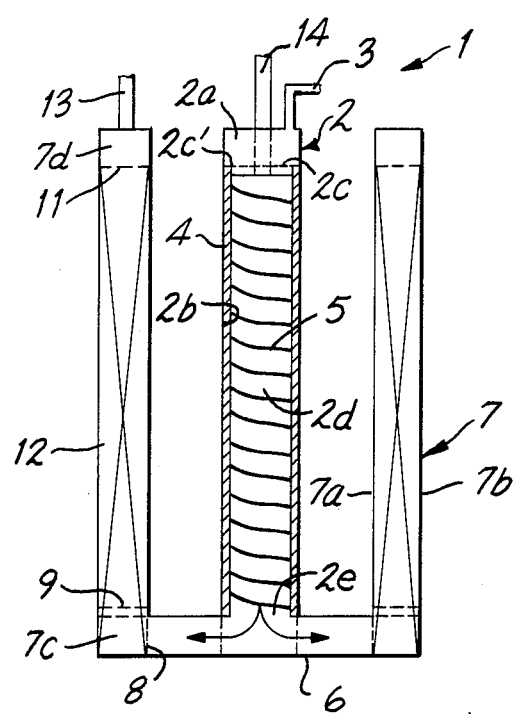

In the FIGURE, apparatus 1 for partially oxidizing, reforming and shift converting hydrocarbon contain fuel, such as, for example, methanol, is illustrated. A centrally located tubular member 2 receives this fuel in an upper chamber 2a formed by the tube inner wall 2b and a horizontal wall 2c, via a feed pipe 3.

The tubular member 2 houses a wick member 4 in a lower chamber 2d. The wick 4 abuts the inner wall 2b and extends along the length of the member 2. The wick 4, typically, might be a metallic fibre mat, such as, a stainless steel mat, having a pore size appropriately selected to ensure wicking of the fuel through the mat.

Interior of the wick 4 within the chamber 2d is a metallic spiral or helix 5 which also extends along the length of the member 2. The spiral 5 may be made of stainless steel and carries a catalyst in the form of a layer on the spiral.

The lower end 2e of the tubular member 2 is coupled by a cylindrical conduit section 6 to an annular member 7 defined by spaced cylindrical walls 7a and 7b which are in surrounding relationship to the member 2. A catalyst impregnated screen 8 is situated at the connecting interface of the conduit section 6 and annular member 7. An annular spacer 9 and annular catalyst screen 11 are affixed in the annular member 7 a short distance above and below, respectively, the respective bottom and top ends 7c and 7d of the member. Supported in the annular space between the spacer 9 and screen 11 is a catalyst bed 12. An output feed pipe 13 is situated at the top end 7b of the member 7 for extracting product gas.

In operation, hydrocarbon containing fuel is introduced into the chamber 2a via feed tube 3 and passes through peripheral openings 2c' in wall 2c into the wick member 4. Also, at this time, introduced into the chamber 2d via a further feed pipe 14 passing through wall 2c is heated exhaust gas from the cathode of a fuel cell. This gas contains, amongst other things, unused oxidant and water.

As the fuel proceeds through the wick 4 the fuel is vaporized. The vaporized fuel then becomes mixed in the chamber 2d with the oxidant in the introduced cathode exhaust gas. This mixing occurs in the presence of the catalyst on the spiral member 5 causing burning or partial oxidation of the fuel. Heat and water are produced as two products of the oxidation. These products, as well as the unburned vaporized fuel and the water and other remaining products in the oxidant exhaust, then flow into the annular member 7.

In the member 7, the fuel, in the presence of the heat, water and catalyst bed 12, is steam reformed to produce hydrogen gas and other products including carbon monoxide. As these constituents proceed to the upper end of the member 7, which end of the member is cooler due to the endothermic nature of the steam reforming reaction, the carbon monoxide in the gas stream in the presence of the catalyst bed undergoes a shift reaction or conversion. This causes conversion of the carbon monoxide to further hydrogen and other products.

The gas stream leaving the exit pipe 13 thus contains substantial amounts of hydrogen gas. This gas can then be directly used as fuel process gas for a fuel cell.

As can be appreciated from the above, the tubular member 2 of the apparatus 1 operates as a vaporizer and partial oxidizer of the fuel introduced into the apparatus, while the annular member 7 operates as a steam reformer and shift converter. Vaporization and partial oxidation thus are accomplished in the same unit, and the heat of the oxidation helps maintain the vaporization as well as the steam reforming in the chamber 7. Use of a separate vaporizer and burner are thereby avoided with the apparatus 1.

The apparatus 1 is additionally advantageous in that use of the spiral member 5 to carry the catalyst in the partial oxidation process enables ready control of the hydrogen gas output, i.e., the throughput of the apparatus, and the pressure drop through the apparatus. Thus, merely by decreasing or increasing the number of spirals per inch of the member 5, these parameters of the apparatus can be changed to give the values desired for any particular application.

It is also noted that the amount of shift conversion resulting with the apparatus can be controlled merely by changing the height of the annular member 7. Similarly, changing the diameter of the annular member at the location where conversion is taking place and/or changing the amount of catalyst at this location will also enable the degree of conversion to be altered.

A further modification of the apparatus 1 would be to incorporate a catalyst into the wick member 4. This would aid in the partial oxidation process occurring in the member 2.

In the member 2, depending upon the conditions, steam reforming, as well as partial oxidation, might also occur. In such case, the member 7 will reform fuel not reformed in the member 2.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention. Thus, for example, the spiral or helix member 5 can be in the form of a corrugated sheet of stainless steel that is twisted into a spiral form.

What is claimed is:

1. Apparatus comprising:
    means for partially oxidizing a hydrocarbon containing fuel comprising: a tubular member having an inner wall; a wick extending along the length of said tubular member adjacent said inner wall; a spiral metallic member including a catalyst disposed thereon, said spiral member being situated adjacent said wick and extending along the length of said tubular member;
    a means for receiving said partially oxidized fuel for reforming said partially oxidized fuel and for shift converting said reformed fuel.
2. Apparatus in accordance with claim 1 wherein: said wick includes a further catalyst.
3. Apparatus in accordance with claim 1 wherein: p1 said catalyst is formed as a layer on said spiral member.
4. Apparatus in accordance with claim 1 wherein: said tubular member further includes: a first port adapted to receive exhaust gas from the cathode section of a fuel cell; and a second port adapted to receive said hydrocarbon containing fuel.
5. Apparatus in accordance with claim 1 wherein: said fuel is methanol.
6. Apparatus in accordance with claim 1 wherein: said reforming and shift converting means comprises: an annular member surrounding said tubular member; an additional catalyst disposed within and along the length of said annular member; and conduit means connecting said tubular and annular members.
7. Apparatus in accordance with claim 6 wherein: said conduit means connects the lower end of said tubular member to the lower end of said annular member.

* * * * *